May 1, 1934.  H. N. SIMPSON  1,956,776
MEANS FOR MAKING HOLLOW CONTAINERS
Filed Feb. 2, 1931
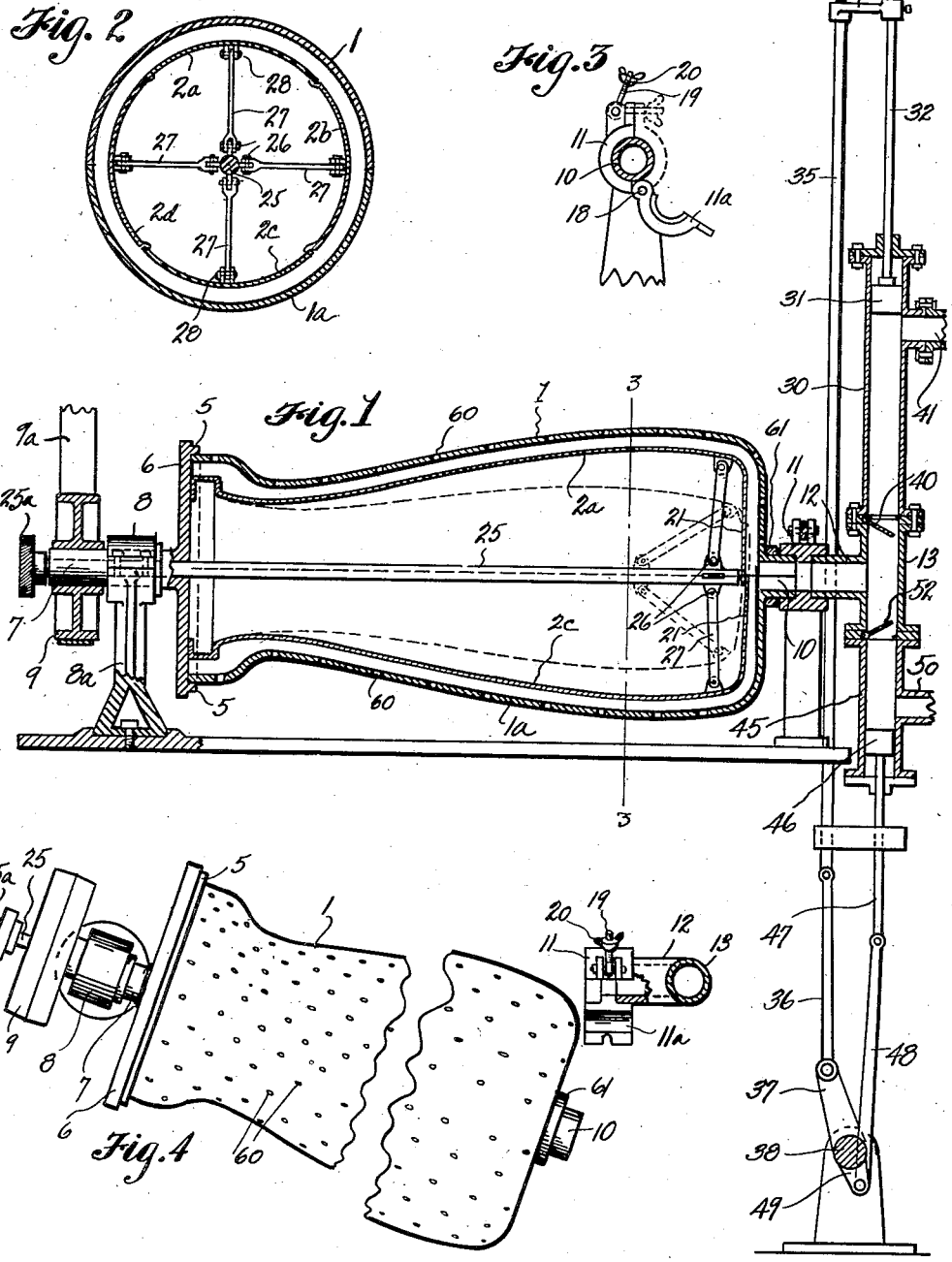
INVENTOR
HERMAN N. SIMPSON
BY
Cook & Robinson
ATTORNEY Patented May 1, 1934

1,956,776

UNITED STATES PATENT OFFICE 1,956,776

MEANS FOR MAKING HOLLOW CONTAINERS

Herman N. Simpson, Port Townsend, Wash.

Application February 2, 1931, Serial No. 512,865

2 Claims. (Cl. 92—58)

This invention relates to the manufacture of hollow ware articles and more particularly to the casting, or molding by a process of centrifugal or pressure molding, of articles such as milk bottles, jars, vases, urns and containers of a similar character, from fibrous pulp or from the cellulose or hemicellulose of vegetable matter, or from such material in solution, which on proper processing becomes firm and solid.

It is the principal object of the present invention to provide a suitable substitute material for glass in the making of opaque, semi-opaque, or transparent containers for liquid or solid materials, and to provide a machine for expeditiously and economically making containers from this material.

More specifically stated, the objects of the invention are, first, to manufacture various containers such as milk bottles, jars, vases, etc., from a specially prepared fibrous pulp, a cellulose or such in solution, which, by proper process of manufacture, will produce containers that are substantially transparent, which are of durable character and commercially satisfactory for use as milk containers; second, to construct a machine in which these containers may be cast, either by centrifugal action or by an application of pressure on the fibrous pulp or other materials used.

Other objects of the invention reside in the various details of construction and in the combination of parts of the machine and in their mode of operation.

Still further objects reside in the method of preparing the pulp, cellulose or such in solution, and in the manner in which it is injected with or without an admixture into the forming molds.

In accomplishing these and other objects of the invention, I have provided a method and certain improved details of construction, the preferred forms of which are illustrated in the accompanying drawing, wherein—

Fig. 1 is a sectional view of a machine for the centrifugal or pressure molding of milk bottles or the like from fibrous pulp, cellulose or such in solution, in accordance with details of the present invention.

Fig. 2 is a transverse sectional view of the mold, this view being taken substantially on the line 2—2 in Fig. 1, and showing the segmental sections of the collapsible, inner form in their expanded relation.

Fig. 3 is a sectional detail taken on the line 3—3 in Fig. 1, illustrating one of the mold-supporting bearings and the hinged side member permitting dismounting of the mold therefrom.

Fig. 4 is a fragmental plan view, illustrating the method of laterally swinging the mold for removal from its supports.

Referring more in detail to the drawing:

The mold herein illustrated is designed for the molding or casting of milk bottles of the ordinary type now generally in use, and it consists of outer and inner forms. The outer form comprises complemental opposite half sections 1 and 1a, and the inner form comprises a series of wall-forming segments 2a, 2b, 2c and 2d, similar in form and assembled lengthwise within the outer form and uniformly spaced from the sections of the outer form so as to provide for the molding between the inner and outer forms of a bottle having walls of a definite and even thickness.

The outer mold is removably fitted at its smaller end within an annular supporting flange 5 that is formed on the inner face of a spindle plate 6 co-axially of the plate supporting spindle 7. The spindle, in turn, is revolubly mounted in a supporting bearing 8 and a wheel 9 is fixed on the outer end of the spindle to carry a driving belt 9a by means of which the plate is revolved to impart rotation to the mold in carrying out the centrifugal process. The larger end of the mold is formed with an axial supporting spindle, or trunnion 10, that is revoluble within a supporting bearing 11. This latter spindle is tubular and when disposed within the bearing it coincides with a tubular passage through the bearing into which the delivery spout 12 of a pulp, cellulose or such in solution, supply pipe 13 is extended. The arrangement of the outer mold is such that when the two half sections 1 and 1a are fitted together, and the closed mold seated at its smaller end within the flange 5 of the spindle plate, and the spindle at the larger end of the mold revolubly fitted within the supporting bearing 11, it will be securely held in place for a centrifugal casting operation, and its two sections, by reason of the flange 5 and the enclosing bearing 11, will be held against relative displacement.

By reference to Figs. 1 and 2 it will be observed that the bearing 8 is mounted by a standard 8a, which is pivotally supported by a pivot bolt 14 which permits it to rotate about the vertical axis of the bolt. It will also be observed by reference particularly to Fig. 3, that the bearing 11 is provided at one side with a hinged half section 11a supported by a pivot pin 18 and adapted to be held in functional position by a clamp bolt 19 attached to bearing 11 and extendable through a slot in part 11a, and equipped with a clamping nut 20. The nut may be unthreaded to permit the half section to swing downwardly, as indicated in full lines in Fig. 3, and thereby permit the supporting trunnion at the larger end of the mold to be displaced laterally from the bearing by a lateral pivotal swinging movement of the mold and spindle parts carried by bearing 8, as shown in Fig. 4. When the mold is in this laterally adjusted position it may be unseated from the flange of the spindle plate.

The inner form, comprising the complemental segments 2a, 2b, 2c and 2d is collapsible in order that the outer mold with the bottle formed therein may be removed from the machine. As shown best in Figs. 1 and 2, these four segmental sections of the inner mold are attached, at the mouth end of the bottle, to the inner face of the spindle plate. They are made of relatively thin metal and when in expanded position, as shown in Fig. 2, provide a completely closed inner form. The segments as illustrated in Fig. 2, overlap each other at their edges to prevent leakage, and at the base end of the bottle have inturned portions 21 which together provide an end wall for the inner form.

For collapsing the segments of the inner form to permit the outer form and the bottle to be withdrawn therefrom, I provide a shaft 25 that extends co-axially and slidably through the supporting shaft or spindle of the spindle plate, and which at its outer end is provided with a nob 25a. This shaft extends well within the form to a position close to the end wall of the inner form. Connected pivotally with this rod within the form as at 26 is a plurality of radially extending toggle links 27 which, at their outer ends, are pivotally connected as at 28 with the individual segments 2a, 2b, 2c and 2d. When the rod is pushed inwardly to its limit, the toggle links are substantially perpendicular with respect thereto and they extend or expand the segments of the form to their outer limits at which they are properly associated with the outer form and also with each other for the casting of a bottle. When the shaft 25 is pulled outwardly, the linkage effects an inward collapsing of the segments, as indicated in dotted lines in Fig. 1. When the inner form is properly collapsed the outer form and the bottle may be withdrawn from about the inner form.

The material which I prefer to use in the formation or casting of the bottles or other containers consists of a fibrous pulp such as that employed in the manufacture of paper, or which may consist of pulp derivations or of the pulp-like cellulose or hemicellulose of vegetable matter, or cellulose in solution which on proper treatment and processing is rendered firm and solid. This pulp is prepared by cooking under pressure in the presence of chemicals used to extract undesirable substances, and by the usual process of washing, bleaching, beating, hydrating, jordaning and mixing with various admixtures, or placed in solution, is rendered capable of being used. When using prepared pulp I mix a certain amount of oil, paraffin, wax or other suitable substance, to be used as a binder, and which causes transparency or opaqueness in the finished product. The oil is not essential when making use of the cellulose in solution.

The pulp may be made from a vegetable or wood fiber, which can be further processed by bleaching. The bleach pulp can be further processed by any of the methods well known to pulp manufacturers, so that the article when it emerges from the mold will be opaque or semi-opaque. Such a pulp can also be rendered transparent, or nearly so, when properly waxed or mixed with an admixture of proper character. Certain chemical pulps can also be made transparent or nearly so by calendering.

Assuming that the pulp has been properly prepared, it is injected into the mold by the following mechanism: Attached to the upper end of the filling pipe 13 is a cylinder 30 in which a piston 31 is contained. The piston is provided with an actuating rod 32 and this is connected through the medium of a lateral arm 34, a vertical rod 35 and link 36 with the crank or throw 37 of a crank shaft 38. The connection provides that with each revolution of the crank shaft, the piston is actuated inwardly and then outwardly. A back check valve 40 is interposed between the cylinder and the delivery pipe 13, therefore, when the piston 31 moves from its inner to its outer position it creates a partial vacuum within the cylinder. A material or pulp delivery pipe 41 leading from a source of supply of prepared material or pulp enters the cylinder near its upper end and at a point just below the piston when the latter is at its outer extremity. Therefore when the piston reaches its outer limit, it uncovers the mouth of supply pipe 41 and the partial vacuum previously created in the cylinder operates to draw in the pulp from the supply pipe so that the cylinder becomes filled. Then as the piston moves downward, this charge of material or pulp is injected from the cylinder past valve 40, through spout 12 and into the mold through the tubular spindle of the outer form.

Since when using pulp it is desirable to mix a substance such as wax, paraffin, or oil or other admixture with the pulp as it enters the mold, I provide also a cylinder 45 which is connected with the lower end of the filling pipe 13. A piston 46 is contained in this cylinder and is actuated by a rod 47 connected by a link 48 with a short throw 49 on the crank shaft 37; the throw 49 being extended directly opposite to the direction of the crank 36. A supply pipe 50 from a source of supply of oil, wax, paraffin or other admixture enters the cylinder 45 near its lower end and a back-check valve 52 is provided between the cylinder 45 and the filling pipe 13. This arrangement provides that during the injection stroke of the piston 31, there will be a similar injection of paraffin by the inward action of the piston 46. It provides also that when the piston 46 moves outwardly, valve 52 will close and a partial vacuum will be created in the piston 45 and the latter will be filled with a charge of paraffin when the piston finally uncovers the supply pipe 50.

Assuming that the various parts of the machine are so constructed and assembled, the sequence of operation would be as follows: First, the inner and outer forms of the mold would be properly assembled, as shown in Fig. 1. Then the crank shaft 37 would be rotated by hand or mechanical means, to reciprocally actuate the pistons of the two cylinders for the injection of pre-determined quantities of material or pulp and paraffin or other admixture. During the molding operation the mold is revolved at high speed by the driving action of the belt about the pulley wheel of the spindle 6. The injected material or the pulp and admixture flows freely within the open space between inner and outer walls of the mold and finally fills the space. The centrifugal action packs this fibrous pulp tightly against the outer mold while the inner mold acts as a means of determining the thickness of the walls of the bottle.

It will be observed that the sections of the outer mold are provided with perforations 60 which are for the purpose of permitting any vapor or gas or any excess of moisture in the material or pulp to be ejected during the centrifugal action. After the form has been filled with the material or pulp, the spinning action is stopped and the form is then removed from the supports by first releasing the half section 11a of the bearing 11, then turning the form laterally by lateral movement of the form with the pivoted bearing 8 so that it is clear of the bearing 11. Then the nob 25a of shaft 25 is drawn outwardly, thereby effecting a collapsing of the segments of the inner form. Then the outer form, with the bottle cast therein, is withdrawn from the spindle plate and from about the inner mold. This outer form with the bottle cast therein may then be placed in a chamber for a predetermined interval of time to effect the curing of and to complete the formation of the bottle, after which the half sections 1 and 1a of the form are removed.

In Fig. 1 I have illustrated the half sections of the outer mold as being held together to facilitate handling by a ring 61 that is fitted about the spindle sections; this, however, is optional.

It is to be understood that I do not wish to confine the present invention to the use of any particular type of molding machine, since it is readily apparent that machines of various design and mode of operation might be provided to carry out the objects of the invention. Neither do I wish the invention to be confined to centrifugal molding, for it is quite apparent that with the mold sections stationary, the material or treated pulp could be injected thereinto under pressure and would form a very satisfactory bottle.

It is the intent that the present invention shall cover the making of hollow containers, such as milk bottles, jars, vases, urns, etc., from a fibrous pulp, properly treated or prepared with admixtures which will produce opaqueness, semi-opaqueness, or transparency in the finished product, or made from a cellulose or such in solution which on proper treatment becomes firm and solid. Also, that the containers be produced by the injection under pressure of the pulp or other material into a prepared mold while the latter is either spinning or stationary. Also that heat, cold, or fluids for depositing cellulose from solution be applied to the article to produce the desired results.

Having thus described my invention, what I claim as new therein and desire to secure by Letters Patent is:

1. A machine of the character described, comprising inner and outer forms, the outer form comprising complemental opposite half sections, the inner form comprising a series of inwardly collapsible wall-forming members, means at the ends of the mold whereby it may be axially supported, means for revolving the mold on its axis, means for injecting a material of a cellulose nature or a fibrous pulp into the mold while it is revolved, and means for collapsing the inner form for removal of the article therefrom.

2. A machine as recited in claim 1, including means for delivering the material of a cellulose nature or the pulp mixture into the mold in definitely measured quantities.

HERMAN N. SIMPSON.